US012664882B2

(12) United States Patent　　(10) Patent No.: US 12,664,882 B2

Zhang et al.　　(45) Date of Patent: Jun. 23, 2026

(54) METHOD AND APPARATUS FOR DETECTING STATE OF TRAFFIC LIGHT, STORAGE MEDIUM, DEVICE AND VEHICLE

(71) Applicant: Momenta (Suzhou) Technology Co., Ltd., Suzhou City (CN)

(72) Inventors: Zhaorui Zhang, Suzhou City (CN); Qianru Li, Suzhou City (CN); Lei Zhang, Suzhou City (CN); Luning Wang, Suzhou City (CN); Jingyuan Xue, Suzhou City (CN); Jiansen Huang, Suzhou City (CN)

(73) Assignee: Momenta (Suzhou) Technology Co., Ltd., Suzhou City (CN)

( * ) Notice: Subject to any disclaimer, the term of this patent is extended or adjusted under 35 U.S.C. 154(b) by 194 days.

(21) Appl. No.: 18/482,045

(22) Filed: Oct. 6, 2023

(65) Prior Publication Data

US 2024/0029554 A1　　Jan. 25, 2024

Related U.S. Application Data

(63) Continuation of application No. PCT/CN2022/099995, filed on Jun. 21, 2022.

(30) Foreign Application Priority Data

May 31, 2022　　(CN) ......................... 202210604797.0

(51) Int. Cl.
| | |
|---|---|
| *G08G 1/01* | (2006.01) |
| *G06V 10/56* | (2022.01) |
| *G06V 20/58* | (2022.01) |

(52) U.S. Cl.
CPC ........... *G08G 1/0112* (2013.01); *G06V 10/56* (2022.01); *G06V 20/584* (2022.01); *G08G 1/0129* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 2013/0253754 A1* | 9/2013 | Ferguson | ............. | G05D 1/0231 |
| | | | | 701/28 |
| 2018/0307925 A1* | 10/2018 | Wisniowski | .............. | G06T 7/73 |

(Continued)

FOREIGN PATENT DOCUMENTS

| | | |
|---|---|---|
| CN | 110335484 A | 10/2019 |
| CN | 110619307 A | 12/2019 |

(Continued)

OTHER PUBLICATIONS

China Patent Office, International Search Report, Application No. PCT/CN2022/099995, mailed Dec. 16, 2022, 4 pages.

*Primary Examiner* — Peter D Nolan
*Assistant Examiner* — Michael F Whalen
(74) *Attorney, Agent, or Firm* — JCIPRNET

(57) ABSTRACT

The present disclosure provides a method and an apparatus for detecting a state of a traffic light, a storage medium a device and a vehicle and belongs to the field of traffic technologies. The method includes: obtaining state detection results for the traffic light based on traffic light images; according to a plurality of state detection results within a first time window and a traffic light state corresponding to each preset road junction type, determining a target road junction type of a target road junction; in response to that a target detection result is present in the state detection results obtained after determining the target road junction type, determining the target detection result as a false detection result, where the target detection result includes a state other than the traffic light state corresponding to the target road junction type.

18 Claims, 2 Drawing Sheets

State detection results for the traffic light based on traffic light images are obtained.　　S110

According to a plurality of state detection results within a first time window and a traffic light state corresponding to each preset road junction type, a target road junction type of a target road junction is determined.　　S120

In response to that a target detection result is present in the state detection results obtained after the first time window, the target detection result is determined as a false detection result.　　S130

(56)                    References Cited

U.S. PATENT DOCUMENTS

| | | | |
|---|---|---|---|
| 2021/0403047 A1 | 12/2021 | Hsiao et al. | |
| 2022/0130153 A1 | 4/2022 | Wang et al. | |
| 2022/0242423 A1* | 8/2022 | Heitzmann | B60W 50/0097 |
| 2022/0262134 A1* | 8/2022 | Wakayama | G09G 5/36 |

FOREIGN PATENT DOCUMENTS

| | | |
|---|---|---|
| CN | 112799412 A | 5/2021 |
| CN | 113689718 A | 11/2021 |
| CN | 113781808 A | 12/2021 |
| CN | 113928335 A | 1/2022 |
| WO | 2021231906 A1 | 11/2021 |

* cited by examiner

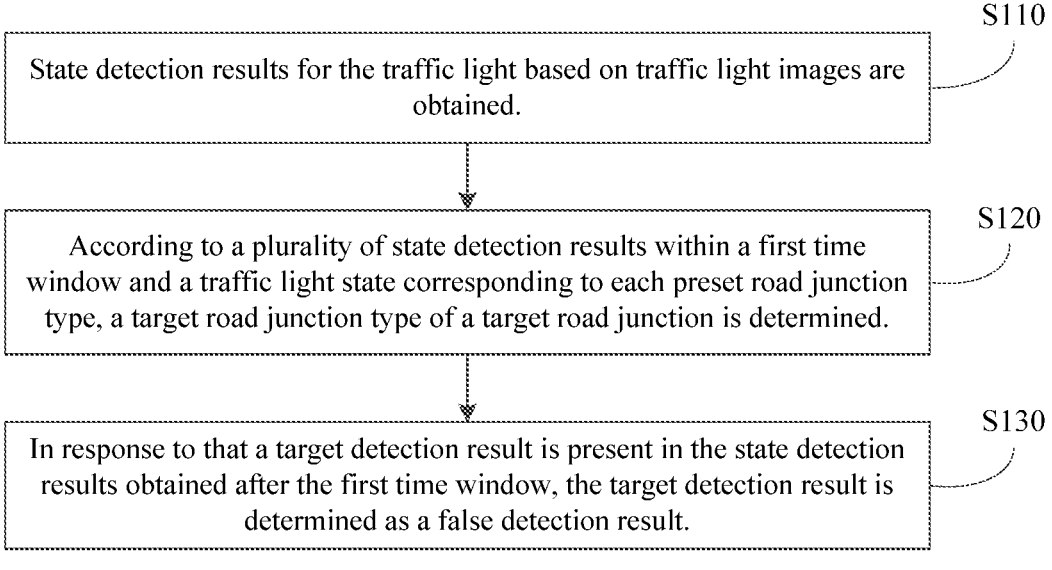

State detection results for the traffic light based on traffic light images are obtained.  ⟋ S110

According to a plurality of state detection results within a first time window and a traffic light state corresponding to each preset road junction type, a target road junction type of a target road junction is determined.  ⟋ S120

In response to that a target detection result is present in the state detection results obtained after the first time window, the target detection result is determined as a false detection result.  ⟋ S130

FIG. 1

| Yellow | Yellow | Yellow | Yellow | Yellow | Red | Red | Red | Red | Red | ← |

FIG. 2a

| Yellow | Yellow | Red | Red | Yellow | Yellow | Red | Red | Yellow | Red | ← |

FIG. 2b

Apparatus for detecting a state of a traffic light

| Obtaining unit | 21 |

| First determining unit | 22 |

| Second determining unit | 23 |

T-Box (remote information processor) 33

ECU (Electronic control unit) 31

Camera 32

METHOD AND APPARATUS FOR DETECTING STATE OF TRAFFIC LIGHT, STORAGE MEDIUM, DEVICE AND VEHICLE

CROSS-REFERENCE TO RELATED APPLICATIONS

This application is a continuation of International Application No. PCT/CN2022/099995, filed on Jun. 21, 2022, which claims priority to Chinese Patent Application No. 202210604797.0, filed on May 31, 2022. The disclosures of the aforementioned applications are hereby incorporated by reference in their entireties.

TECHNICAL FIELD

The present disclosure relates to the field of traffic technologies, and in particular to a method and an apparatus for detecting a state of a traffic light, a storage medium, a device and a vehicle.

BACKGROUND

In intelligent drive or automatic drive, it is usually required to recognize a state of a traffic light such that a travel of a vehicle is controlled based on a recognition result.

In the related arts, a method for recognizing a state of a traffic light mainly includes: collecting images containing the traffic light, and recognizing the images by using a machine learning-based traffic light recognition algorithm so as to obtain a traffic light state, for example, red light. However, since the machine learning-based traffic light recognition algorithm is liable to influence of background colors, lights of vehicles ahead and road lamps and the like, there may be a problem of mistakenly recognizing the traffic light state, further affecting traffic safety.

Therefore, it is urgent to find a method of detecting a false detection problem occurring when traffic light images are recognized by using the machine learning-based traffic light recognition algorithm.

SUMMARY

The present disclosure provides a method and an apparatus for detecting a state of a traffic light, a storage medium, a device and a vehicle, so as to accurately detect a false detection problem occurring when traffic light images are recognized by using a machine learning-based traffic light recognition algorithm.

The specific technical solution is provided below.

According to a first aspect of embodiments of the present disclosure, there is provided a method of detecting a state of a traffic light, including:

obtaining state detection results for the traffic light based on traffic light images;

according to a plurality of state detection results within a first time window and a traffic light state corresponding to each preset road junction type, determining a target road junction type of a target road junction;

in response to that a target detection result is present in the state detection results obtained after determining the target road junction type, determining the target detection result as a false detection result, where the target detection result includes a state other than the traffic light state corresponding to the target road junction type.

It can be known from the above solution that, in the embodiments of the present disclosure, the target road junction type of the target road junction may be firstly determined according to a plurality of state detection results within the first time window and the traffic light state corresponding to each preset road junction type; after the target road junction type is determined, if there is a target detection result of a state other than the traffic light state corresponding to the target road junction type in the obtained state detection results, the target detection result is determined as a false detection result. Thus, an impossible state detection result of the target road junction can be quickly and accurately recognized, so as to avoid making a wrong drive decision based on the false detection result, thus improving the traffic safety.

In a first possible implementation of the first aspect, after, according to a plurality of state detection results within the first time window and the traffic light state corresponding to each preset road junction type, determining the target road junction type of the target road junction, the method further includes:

in response to that the target road junction type determined according to a plurality of state detection results within a second time window and the traffic light state corresponding to each preset road junction type changes, updating the target road junction type.

It can be known from the above solution that, in the embodiments of the present disclosure, after the target road junction type is firstly determined, whether the target road junction type changes may be detected and updating is performed in a case of change. Thus, the accuracy of determining the target road junction type is further improved.

In a second possible implementation of the first aspect, according to a plurality of state detection results within the first time window and the traffic light state corresponding to each preset road junction type, determining the target road junction type of the target road junction includes:

in response to that there are at least two cases with the road junction type of the target road junction determined according to a plurality of state detection results within the first time window, postponing a start time of the first time window until the road junction type determined according to a plurality of state detection results within the postponed first time window and the traffic light state corresponding to each preset road junction type is unique, and determining a last-determined road junction type as the target road junction type.

In a third possible implementation of the first aspect, in response to that the target road junction type is a conventional traffic light junction, the method further includes:

when a plurality of consecutive state detection results obtained after the target road junction type is determined all are a first traffic light state and the state detection result determined based on a next traffic light image is a second traffic light state, determining the state detection result determined based the next traffic light image as a false detection result, where the first traffic light state is different from the second traffic light state, and the first traffic light state and the second traffic light state are not adjacent to each other in a traffic light state switching sequence of the conventional traffic light junction.

It can be known from the above solution that, in response to that the target road junction type is a conventional traffic light junction, a false detection result may be recognized by determining whether state detection results are in compliance with the traffic light state switching sequence, further improving the accuracy of the false detection recognition.

In a fourth possible implementation of the first aspect, in response to that the target road junction type is a conventional traffic light junction, the method further includes:

according to historical detection results and/or a current detection result, determining a true result corresponding to the current detection result, where the historical detection results are state detection results detected within a historical time, and the current detection result is a state detection result currently detected.

It can be known from the above solution that, in response to that the target road junction type is a conventional traffic light junction, a true result corresponding to the current detection result is determined according to the historical detection results and/or current detection result, such that a correct drive decision can be made based on the true result, so as to further avoid making a wrong drive decision based on the false detection result. Thus, the traffic safety is further improved.

In a fifth possible implementation of the first aspect, according to the historical detection results and/or current detection result, determining the true result corresponding to the current detection result comprises:

by starting from that the historical detection result is yellow light, when the current detection result is red light and a drive decision is a braking-to-stop decision, determining the true result corresponding to the current detection result is red light; or, by starting from the historical detection result is yellow light, in response to that the drive decision is a run-through decision, when a plurality of consecutive state detection results all are that a number of red lights is less than A, or a ratio of red lights in a B number of consecutive state detection results is less than a first preset ratio threshold, determining the true result corresponding to the current detection result is yellow light; when an A number of consecutive state detection results all are red lights, or a ratio of red lights in a B number of consecutive state detection results is greater than or equal to the first preset ratio threshold, determining the true result corresponding to the current detection result is red light, where the A is less than or equal to the B, the A and the B are both positive integers, and the A number of consecutive state detection results and the B number of consecutive state detection results both include the historical detection results and the current detection result.

It can be known from the above solution that, by starting from that the historical detection result is yellow light, when the current detection result is red light and the drive decision is a braking-to-stop decision, no matter whether the yellow light is mistakenly detected as red light, because the yellow light and the red light decisions both are braking to stop, the true result corresponding to the current detection result may be determined as red light; by starting from that the historical detection result is yellow light, in response to that the drive decision is a run-through decision, when a red light appears later, the true result is not immediately determined as red light but only when an A number of consecutive state detection results all are red lights or a ratio of red lights in a B number of consecutive state detection results is greater than or equal to the first preset ratio threshold can the true result corresponding to the current detection result be determined as red light; the braking-to-stop decision can be made only when the true result is red light. Thus, the circumstance that the run-through of a target vehicle is affected or the target vehicle collides with a vehicle behind due to the yellow light being mistakenly detected as red light can be avoided, so as to improve the traffic safety.

In a sixth possible implementation of the first aspect, in response to that a target vehicle is a leading vehicle, according to the historical detection results and/or the current detection result, determining the true result corresponding to the current detection result includes:

by starting from that the historical detection result is red light, when a plurality of consecutive state detection results all are that a number of green lights is less than C, or a ratio of green lights in a D number of consecutive state detection results is less than a second preset ratio threshold, determining the true result corresponding to the current detection result is red light; when a C number of consecutive state detection results all are green lights, or a ratio of green lights in a D number of consecutive state detection results is greater than or equal to the second preset ratio threshold, determining the true result corresponding to the current detection result is green light, where the C is less than or equal to the D, the C and the D both are positive integers, and the C number of consecutive state detection results and the D number of consecutive state detection results both include the historical detection results and the current detection result.

It can be known from the above solution that, by starting from that the historical detection result is red light, when a green light appears later, the true result is not immediately determined as green light but only when a C number of consecutive state detection results all are green lights or a ratio of green lights in a D number of consecutive state detection results is greater than or equal to the second preset ratio threshold can the true result corresponding to the current detection result be determined as green light; the run-through decision can be made only when the true result is green light. In this way, the circumstance that the red light is run through for early drive when the red light is mistakenly detected as green light can be avoided, thereby improving the traffic safety.

In a seventh possible implementation of the first aspect, in response to that the target vehicle is in a red light waiting state of leading vehicle, the method further includes:

when a speed of the leading vehicle in a target lane changes from 0 to greater than or equal to a preset speed threshold, determining the true result corresponding to the current detection result is green light, where the red light waiting state of leading vehicle includes the speed of the target vehicle as the leading vehicle being 0, the state detection result being red light, and the target vehicle corresponding to the target lane, and the target lane and a lane to which the target vehicle belongs are adjacent lanes having a same travel direction.

It can be known from the above solution that, when the target vehicle is in the red light waiting state of leading vehicle, a start timing of the target vehicle (a timing of generating a run-through decision based on green light) may also be determined by referring to a start timing of a leading vehicle in an adjacent lane. In this way, the circumstance that the red light is run through for early drive when the red light is mistakenly detected as green light can be avoided, thereby improving the traffic safety.

In an eighth possible implementation of the first aspect, according to the historical detection results and/or the current detection result, determining the true result correspond-ing to the current detection result includes:

by starting from that the historical detection result is green light, when the current detection result does not reach a P-th light extinguishment, determining the true result corresponding to the current detection result is green light; when the current detection result is a P-th light extinguishment, determining the true result corresponding to the current detection result is green flash, wherein the P is a positive integer.

In a ninth possible implementation of the first aspect, in response to that the target road junction type is a conventional traffic light junction, the method further includes:

in response to that two adjacent state detection results are green light and light extinguishment one after another respectively, when the state detection result determined based on a next traffic light image is yellow light, determining the true results corresponding to the two adjacent state detection results are that the two adjacent state detection results are entirely green flash.

In a tenth possible implementation of the first aspect, the method further includes:

when it is detected continuously that a time length of yellow light exceeds a third time window, determining yellow flash is detected mistakenly as yellow light.

In an eleventh possible implementation of the first aspect, obtaining the state detection results for the traffic light based on the traffic light images includes:

by starting from a preset distance from the target road junction, obtaining the state detection results for the traffic light based on the traffic light images.

According to a second aspect of the embodiments of the present disclosure, there is provided an apparatus for detecting a state of a traffic light, including:

an obtaining unit, configured to obtain state detection results for the traffic light based on traffic light images;

a first determining unit, configured to, according to a plurality of state detection results within a first time window and a traffic light state corresponding to each preset road junction type, determine a target road junction type of a target road junction;

a second determining unit, configured to, in response to that a target detection result is present in the state detection results obtained after determining the target road junction type, determine the target detection result as a false detection result, where the target detection result includes a state other than the traffic light state corresponding to the target road junction type.

It can be known from the above solution that, in the embodiments of the present disclosure, the target road junction type of the target road junction may be firstly determined according to a plurality of state detection results within the first time window and the traffic light state corresponding to each preset road junction type; after the target road junction type is determined, if there is a target detection result of a state other than the traffic light state corresponding to the target road junction type in the obtained state detection results, the target detection result is determined as a false detection result. Thus, an impossible state detection result of the target road junction can be quickly and accurately recognized, so as to avoid making a wrong drive decision based on the false detection result, thus improving the traffic safety.

In a first possible implementation of the second aspect, the apparatus further includes:

an updating unit, configured to, after according to a plurality of state detection results within the first time window and the traffic light state corresponding to each preset road junction type, determining the target road junction type of the target road junction, in response to that the target road junction type determined according to a plurality of state detection results within a second time window and the traffic light state corresponding to each preset road junction type changes, update the target road junction type.

In a second possible implementation of the second aspect, the first determining unit is configured to, in response to that there are at least two cases with the road junction type of the target road junction determined according to a plurality of state detection results within the first time window, postpone a start time of the first time window until the road junction type determined according to a plurality of state detection results within the postponed first time window and the traffic light state corresponding to each preset road junction type is unique, and determine a last-determined road junction type as the target road junction type.

In a third possible implementation of the second aspect, the apparatus further includes:

a third determining unit, configured to, in response to that the target road junction type is a conventional traffic light junction, when a plurality of consecutive state detection results obtained after the target road junction type is determined all are a first traffic light state and the state detection result determined based on a next traffic light image is a second traffic light state, determine the state detection result determined based the next traffic light image as a false detection result, where the first traffic light state is different from the second traffic light state, and the first traffic light state and the second traffic light state are not adjacent to each other in a traffic light state switching sequence of the conventional traffic light junction.

In a fourth possible implementation of the second aspect, the apparatus further includes:

a fourth determining unit, configured to, in response to that the target road junction type is a conventional traffic light junction, according to historical detection results and/or a current detection result, determine a true result corresponding to the current detection result, where the historical detection results are state detection results detected within a historical time, and the current detection result is a state detection result currently detected.

In a fifth possible implementation of the second aspect, the fourth determining unit includes a first determining module or a second determining module;

the first determining module is configured to, by starting from that the historical detection result is yellow light, when the current detection result is red light and a drive decision is a braking-to-stop decision, determine the true result corresponding to the current detection result is red light;

the second determining module is configured to, by starting from the historical detection result is yellow light, in response to that the drive decision is a run-through decision, when a plurality of consecutive state detection results all are that a number of red lights is less than A, or a ratio of red lights in a B number of consecutive state detection results is less than a first preset ratio threshold, determine the true result corresponding to the current detection result is yellow light; when an A number of consecutive state detection results all are red lights, or a ratio of red lights in a B number of consecutive state detection results is greater than or equal to the first preset ratio threshold, determine the true result corresponding to the current detection result is red light, where the A is less than or equal to the B, the A and the B are both positive integers, and the A number of consecutive state detection results and the B number of consecutive state detection results both include the historical detection results and the current detection result.

In a sixth possible implementation of the second aspect, the fourth determining unit includes:

a third determining module, configured to, in response to that a target vehicle is a leading vehicle, by starting from that the historical detection result is red light, when a plurality of consecutive state detection results all are that a number of green lights is less than C, or a ratio of green lights in a D number of consecutive state detection results is less than a second preset ratio threshold, determine the true result corresponding to the current detection result is red light; when a C number of consecutive state detection results all are green lights, or a ratio of green lights in a D number of consecutive state detection results is greater than or equal to the second preset ratio threshold, determine the true result corresponding to the current detection result is green light, where the C is less than or equal to the D, the C and the D both are positive integers, and the C number of consecutive state detection results and the D number of consecutive state detection results both include the historical detection results and the current detection result.

In a seventh possible implementation of the second aspect, the apparatus further includes:

a fifth determining unit, configured to, in response to that the target vehicle is in a red light waiting state of leading vehicle, when a speed of the leading vehicle in a target lane changes from 0 to greater than or equal to a preset speed threshold, determine the true result corresponding to the current detection result is green light, where the red light waiting state of leading vehicle includes the speed of the target vehicle as the leading vehicle being 0, the state detection result being red light, and the target vehicle corresponding to the target lane, and the target lane and a lane to which the target vehicle belongs are adjacent lanes having a same travel direction.

In an eighth possible implementation of the second aspect, the fourth determining unit includes:

a fourth determining module, configured to, by starting from that the historical detection result is green light, when the current detection result does not reach a P-th light extinguishment, determine the true result corresponding to the current detection result is green light; when the current detection result is a P-th light extinguishment, determine the true result corresponding to the current detection result is green flash, where the P is a positive integer.

In a ninth possible implementation of the second aspect, the apparatus further includes:

a sixth determining unit, configured to, in response to that the target road junction type is a conventional traffic light junction, when that two adjacent state detection results are green light and light extinguishment one after another respectively, if the state detection result determined based on a next traffic light image is yellow light, determine the true results corresponding to the two adjacent state detection results are that the two adjacent state detection results are entirely green flash.

In a tenth possible implementation of the second aspect, the apparatus further includes:

a seventh determining unit, configured to, when it is detected continuously that a time length of yellow light exceeds a third time window, determine yellow flash is detected falsely as yellow light.

In an eleventh possible implementation of the second aspect, the obtaining unit is configured to, by starting from a preset distance from the target road junction, obtain the state detection results for the traffic light based on the traffic light images.

According to a third aspect of embodiments of the present disclosure, there is provided a storage medium storing computer programs, where the programs are executed by a processor to perform the method described in any one implementation of the first aspect.

According to a fourth aspect of embodiments of the present disclosure, there is provided a electronic device, including:

one or more processors;

a storage apparatus, configured to store one or more programs;

where the one or more programs are executed by one or more processors to cause the electronic device to perform the method described in any one possible implementation of the first aspect.

According to a fifth aspect of embodiments of the present disclosure, there is provided a vehicle, including the apparatus in any possible implementation of the second aspect or the electronic device of the fourth aspect.

BRIEF DESCRIPTION OF THE DRAWINGS

In order to more clearly describe the technical solution in the embodiments of the present disclosure or in the prior arts, the drawings required for descriptions of the embodiments or the prior arts will be briefly introduced below. Apparently, the drawings described hereunder are only some embodiments of the present disclosure. Those skilled in the art may obtain other drawings based on these drawings without making creative work.

FIG. 1 is a flowchart illustrating a method of detecting a state of a traffic light according to an embodiment of the present disclosure.

FIG. 2a is an exemplary diagram illustrating a traffic light state detection according to an embodiment of the present disclosure.

FIG. 2b is an exemplary diagram illustrating another traffic light state detection according to an embodiment of the present disclosure.

DETAILED DESCRIPTION OF THE EMBODIMENTS

Figures 3, 4:
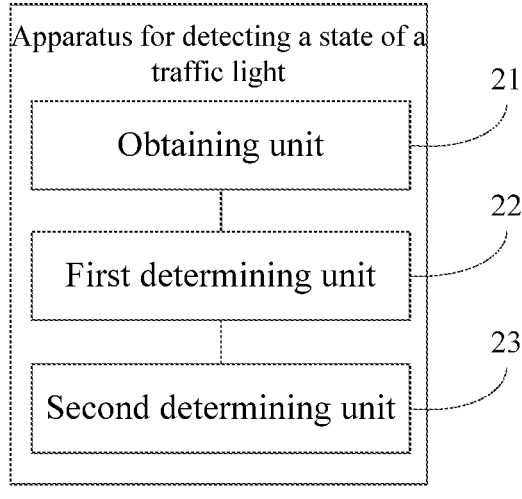
FIG. 3 is a block diagram illustrating composition of an apparatus for detecting a state of a traffic light according to an embodiment of the present disclosure.
FIG. 4 is a structural schematic diagram illustrating a vehicle according to an embodiment of the present disclosure.

The technical solution of the present disclosure will be fully and clearly described below in combination with the drawings in the embodiments of the present disclosure. Apparently, the embodiments described herein are only some embodiments of the present disclosure rather than all embodiments. All other embodiments obtained by those skilled in the art based on these embodiments without making creative work shall all fall within the scope of protection of the present disclosure.

It should be noted that, in a case of no conflicts, the embodiments of the present disclosure or features in the embodiments may be mutually combined. The terms such as "include" and "have" and any variations thereof in the embodiments and the drawings of the present disclosure are intended to cover the non-exclusive inclusion. For example, processes, methods, systems, products or devices including a series of steps or units are not limited to those listed steps or units but optionally further include those unlisted steps or units or optionally further include other steps or units inherent to these processes, methods, products or devices.

FIG. 1 is a flowchart illustrating a method of detecting a state of a traffic light. The method may be applied to an electronic device or a computer device, and specifically may be applied to a vehicle or server. The method may include the following steps.

At step S110, state detection results for the traffic light based on traffic light images are obtained.

The execution subject for performing detection on the traffic light based on traffic light images to obtain state detection results may be same as or different from the execution subject of the embodiments of the present disclosure. When both are different, the execution subject of the embodiments of the present disclosure may obtain the state detection results from the other execution subject. When the execution subject of the embodiments of the present disclosure is a self-driving vehicle, the execution subject for performing detection on the traffic light based on the traffic light images to obtain the state detection results may also be a self-driving vehicle or a server or a Vehicle-to-Everything (V2X) device (e.g. vehicle around the self-driving vehicle, roadside device or the like) other the server. The traffic light images may be collected by a camera on the self-driving vehicle, or by another vehicle within a preset distance range from the self-driving vehicle or by a roadside device. The preset distance range is indicated by the following limiting rules: the traffic light images collected by another vehicle or a roadside device can contain the same traffic light state as the traffic light images collected by the self-driving vehicle. For example, within the preset distance range are front, rear, left and right vehicles adjacent to the self-driving vehicle and roadside devices having a distance less than a preset distance threshold (e.g. 10 meters) from the self-driving vehicle. When the execution subject of the embodiments of the present disclosure is a self-driving vehicle, the target vehicle mentioned in the following embodiments is the self-driving vehicle; when the execution subject of the embodiments of the present disclosure is a server, the target vehicle mentioned in the following embodiments is a vehicle in communication with the server.

Performing detection on the traffic light based on the traffic light images to obtain the state detection results may be specifically implemented as follows: based on a neural network model, performing state recognition on the traffic light images to obtain the state detection results. The neural network model may be trained based on a plurality of historical traffic light images added with traffic light state labels, and the state detection results include the traffic light state of the traffic light.

In order to avoid resource wastes and inaccurate remote detection, in the embodiments of the present disclosure, the state detection results for the traffic light based on the traffic light images may be obtained by starting from a preset distance from a target road junction. Specifically, by starting from the preset distance from a stop line of the target road junction, the state detection results for the traffic light based on the traffic light images may be obtained. The preset distance may be an empirical value, for example, 120 meters.

At step S120, according to a plurality of state detection results within a first time window and a traffic light state corresponding to each preset road junction type, a target road junction type of a target road junction is determined.

The preset road junction type includes a conventional traffic light junction, a yellow flash road junction or a light extinguishment road junction or the like. The traffic light state of the conventional traffic light junction includes red light, yellow light, green light and green flash, the traffic light state of the yellow flash road junction includes yellow flash, and the traffic light state of the light extinguishment road junction includes light extinguishment (or blackout). The first time window may be determined based on actual experiences, for example, may be set to 2 s.

When a plurality of state detection results within the first time window all are the traffic light state corresponding to a particular preset road junction type, the target road junction type is determined as the preset road junction type. Specifically, when a plurality of state detection results within the first time window all are the light extinguishment, the target road junction type is determined as the light extinguishment road junction; when a plurality of state detection results within the first time window all are the yellow flash, the target road junction type is determined as the yellow flash road junction; when a plurality of state detection results within the first time window include one or more of red, yellow, green and green flash, the target road junction type is determined as the conventional traffic light junction.

Furthermore, in response to that there are at least two cases with the road junction type of the target road junction determined according to a plurality of state detection results within the first time window, a start time of the first time window is postponed until the road junction type determined according to a plurality of state detection results within the postponed first time window and the traffic light state corresponding to each preset road junction type is unique, and a last-determined road junction type is determined as the target road junction type.

For example, when a plurality of state detection results within the first time window include one or more of red light, yellow light, green light and green flash as well as one or more of the light extinguishment and the yellow flash, it indicates that a false detection is present within the first time window and the start time of the first time window may be postponed until the road junction type determined according to a plurality of state detection results within the postponed first time window and the traffic light state corresponding to each preset road junction type is unique, and the last-determined road junction type is determined as the target road junction type.

In one implementation, in order to improve the accuracy of determining the target road junction type, after the target road junction type of the target road junction is determined according to a plurality of state detection results within the first time window and the traffic light state corresponding to each preset road junction type, in response to that the target road junction type determined according to a plurality of state detection results within a second time window and the traffic light state corresponding to each preset road junction type changes, the target road junction type is updated. The second time window is greater than or equal to the first time window, for example, the second time window is N times the first time window, where N is a positive integer. When at least one road junction type determined within the second time window is a same road junction type and different from the target road junction type determined within the first time window, the target road junction type is updated to the same road junction type without updating later.

At step S130, in response to that a target detection result is present in the state detection results obtained after determining the target road junction type, the target detection result is determined as a false detection result.

The target detection result includes a state other than the traffic light state corresponding to the target road junction type. Namely, after the target road junction type is determined, if a traffic light state corresponding to other road junction types is detected, it indicates the traffic light state corresponding to the other road junction types is a false detection result. For example, if the yellow flash is present in the state detection results obtained after the target road junction type is determined as the conventional traffic light junction, the yellow flash is determined as a false detection result.

It is to be further noted that the embodiments of the present disclosure may be applied to a self-driving scenario or a manual driving scenario. When they are applied to the self-driving scenario, after a false detection occurs, the false detection result may be neglected to restart detection, or maintain a previous state detection result unchanged, or correction is performed to the false detection result based on the method of determining a true result in the following embodiments. When they are applied to the manual driving scenario, after a false detection occurs, a false detection prompt may be sent to the driver to prompt the driver to confirm the traffic light ahead by himself in addition to adopting the method in the self-driving scenario. When the target detection result is determined as a false detection result in the step S130, a true result corresponding to the target detection result is determined as a state detection result based on a previous traffic light image.

In the method of detecting a state of a traffic light according to the embodiments of the present disclosure, the target road junction type of the target road junction may be firstly determined according to a plurality of state detection results within the first time window and the traffic light state corresponding to each preset road junction type; after the target road junction type is determined, if there is a target detection result of a state other than the traffic light state corresponding to the target road junction type in the obtained state detection results, the target detection result is determined as a false detection result. Thus, an impossible state detection result of the target road junction can be quickly and accurately recognized, so as to avoid making a wrong drive decision based on the false detection result, thus improving the traffic safety.

In one implementation, in response to that the target road junction type is a conventional traffic light junction, the method further includes: when a plurality of consecutive state detection results obtained after the target road junction type is determined all are a first traffic light state and the state detection result determined based on a next traffic light image is a second traffic light state, the state detection result determined based the next traffic light image is determined as a false detection result, where the first traffic light state is different from the second traffic light state, and the first traffic light state and the second traffic light state are not adjacent to each other in a traffic light state switching sequence of the conventional traffic light junction. In the embodiments of the present disclosure, the next traffic light image is a next traffic light image adjacent to the last traffic light image in the traffic light images corresponding to a plurality of consecutive state detection results.

Illustratively, the traffic light state switching sequence of the conventional traffic light junction is green light->green flash->yellow light->red light and then the red light is switched to the green light to repeat a next cycle. When a plurality of consecutive state detection results obtained after the target road junction type is determined all are green light, if the state detection result determined based on the next traffic light image is yellow light or red light, the yellow light or the red light is determined as a false detection result; when a plurality of consecutive state detection results obtained after the target road junction type is determined all are green flash, if the state detection result determined based on the next traffic light image is red light or green light, the red light or the green light is determined as a false detection result; when a plurality of consecutive state detection results obtained after the target road junction type is determined all are yellow light, if the state detection result determined based on the next traffic light image is green light or green flash, the green light or the green flash is determined as a false detection result; when a plurality of consecutive state detection results obtained after the target road junction type is determined all are red light, if the state detection result determined based on the next traffic light image is green flash or yellow light, the green flash or the yellow light is determined as a false detection result.

It can be known from the above solution that in response to that the target road junction type is a conventional traffic light junction, in the embodiments of the present disclosure, a false detection result may be recognized by determining whether the state detection results are in compliance with the traffic light state switching sequence, further improving the accuracy of the false detection recognition.

In one implementation, in order to further improve the drive safety, when a false detection occurs, the false detection result may be corrected to obtain a true result, such that a correct drive decision can be made based on the true result, so as to avoid making a wrong drive decision based on the false detection result, further improving the traffic safety.

When the target road junction type is a yellow flash road junction, after the step S130 is performed, the true result corresponding to the target detection result is determined as yellow flash; when the target road junction type is a light extinguishment road junction, after the step S130 is performed, the true result corresponding to the target detection result is determined as light extinguishment.

When the target road junction type is a conventional traffic light junction, the method of determining the true result includes: according to historical detection results and/or a current detection result, determining a true result corresponding to the current detection result, where the historical detection results are state detection results detected within a historical time, and the current detection result is a state detection result currently detected.

The specific implementation processes under different scenarios will be described below.

Scenario 1: by starting from that the historical detection result is yellow light, when the current detection result is red light and the drive decision is a braking-to-stop decision, it is determined that the true result corresponding to the current detection result is red light; or, by starting from that the historical detection result is yellow light, in response to that the drive decision is a run-through decision, when a plurality of consecutive state detection results all are that a number of red lights is less than A, or a ratio of red lights in a B number of consecutive state detection results is less than a first preset ratio threshold, the true result corresponding to the current detection result is determined as yellow light; when an A number of consecutive state detection results all are red lights, or a ratio of red lights in a B number of consecutive state detection results is greater than or equal to the first preset ratio threshold, the true result corresponding to the current detection result is determined as red light, where the A is less than or equal to the B, the A and the B both are positive integers, and the A number of consecutive state detection results and the B number of consecutive state detection results both include the historical detection results and the current detection result. The specific values of the A, the B and the first preset ratio threshold may be set in such a way that it is ensured that a decision delay is less than a predicted delay threshold (e.g. 500 ms) and the traffic rules are not violated. For example, A=5, B=10, and the first preset ratio threshold=50%.

Since the decision on yellow light is accurately calculated, there is, under normal circumstances, no scenario of "the yellow light decision for running through jumps to red light when the self-driving vehicle does not run through the target road junction". Therefore, when the drive decision in a case of yellow light is a run-through decision, before the self-driving vehicle runs through the target road junction, if the state detection result is red light, there is a high possibility of false detection. The true red light can be confirmed only when five frames of red lights are continuously detected. If there are three frames of red lights+one frame of yellow light+two frames of red lights (namely, there are five frames of red lights in the six frames), it is considered that the one frame of yellow light among them is a false detection. Even if a true red light appears when the self-driving vehicle actually runs through the stop line, the self-driving vehicle can be braked to stop in a maximum distance of 8.3 meters based on the urban area upper limit of 60 KM/h, and the traffic rules will not be violated.

Illustratively, when A=5, B=10 and the first preset ratio threshold=50%, as shown in FIG. 2a, if five consecutive state detection results all are red lights, the true result corresponding to the current detection result is determined as red light, or as shown in FIG. 2b, if the ratio of red lights in ten consecutive state detection results is equal to 50%, the true result corresponding to the current detection result can also be determined as red light.

It can be known from the above solution that, in the embodiments of the present disclosure, by starting from that the historical detection result is yellow light, when the current detection result is red light and the drive decision is a braking-to-stop decision, no matter whether the yellow light is mistakenly detected as red light, because the yellow light and the red light decisions both are braking to stop, the true result corresponding to the current detection result may be determined as red light; by starting from that the historical detection result is yellow light, in response to that the drive decision is a run-through decision, when a red light appears later, the true result is not immediately determined as red light but only when an A number of consecutive state detection results all are red lights or a ratio of red lights in a B number of consecutive state detection results is greater than or equal to the first preset ratio threshold can the true result corresponding to the current detection result be determined as red light; the braking-to-stop decision can be made only when the true result is red light. Thus, the circumstance that the run-through of a target vehicle is affected or the target vehicle collides with a vehicle behind due to the yellow light being mistakenly detected as red light can be avoided, so as to improve the traffic safety.

Scenario 2: in response to that a target vehicle is a leading vehicle, by starting from that the historical detection result is red light, when a plurality of consecutive state detection results all are that a number of green lights is less than C, or a ratio of green lights in a D number of consecutive state detection results is less than a second preset ratio threshold, the true result corresponding to the current detection result is determined as red light; when a C number of consecutive state detection results all are green lights, or a ratio of green lights in a D number of consecutive state detection results is greater than or equal to the second preset ratio threshold, the true result corresponding to the current detection result is determined as green light, where the C is less than or equal to the D, the C and the D both are positive integers, and the C number of consecutive state detection results and the D number of consecutive state detection results both include the historical detection results and the current detection result. The values of the A and C, the values of the B and D or the values of the first preset ratio threshold and the second preset ratio threshold may be same or different to ensure low decision delay and high accuracy. Furthermore, when the true result corresponding to the current detection result is determined as green light, the drive decision may be changed from braking-to-stop decision to the run-through decision. The leading vehicle refers to a vehicle closest to the target road junction in each lane in the vehicles traveling toward the target road junction, and in plain words, the leading vehicle refers to a first vehicle traveling to the target road junction in each lane.

It can be known from the above solution that, by starting from that the historical detection result is red light, when a green light appears later, the true result is not immediately determined as green light but only when a C number of consecutive state detection results all are green lights or a ratio of green lights in a D number of consecutive state detection results is greater than or equal to the second preset ratio threshold can the true result corresponding to the current detection result be determined as green light; the run-through decision can be made only when the true result is green light. In this way, the circumstance that the red light is run through for early drive when the red light is mistakenly detected as green light can be avoided, thereby improving the traffic safety.

In one implementation, in response to that the target vehicle is in a red light waiting state of leading vehicle, the method further includes: when a speed of the leading vehicle in a target lane changes from 0 to greater than or equal to a preset speed threshold, determining the true result corresponding to the current detection result is green light, where the red light waiting state of leading vehicle includes the speed of the target vehicle as the leading vehicle being 0, the state detection result being red light, and the target vehicle corresponding to the target lane, and the target lane and a lane to which the target vehicle belongs are adjacent lanes having a same travel direction. In other words, when the target vehicle is in the red light waiting state of leading vehicle, the target vehicle may start by referring to the start of a leading vehicle in an adjacent lane. The preset speed threshold may be set based on actual experiences, for example, may be set to 1 m/s.

It is to be further noted that when the target vehicle is not a leading vehicle, if the red light is mistakenly detected as green light, the self-driving vehicle can be braked to stop for the vehicle ahead is braked to stop and thus will not affect the drive decision. Hence, the case that the red light is mistakenly detected as green light can be neglected.

It can be known from the above solution that, when the target vehicle is in the red light waiting state of leading vehicle, in the embodiments of the present disclosure, a start timing of the target vehicle (a timing of generating a run-through decision based on green light) may also be determined by referring to a start timing of a leading vehicle in an adjacent lane. In this way, the circumstance that the red light is run through for early drive when the red light is mistakenly detected as green light can be avoided, thereby improving the traffic safety.

Scenario 3: by starting from that the historical detection result is green light, when the current detection result does not reach a P-th light extinguishment, the true result corresponding to the current detection result is determined as green light; when the current detection result is a P-th light extinguishment, the true result corresponding to the current detection result is determined as green flash, where the P is a positive integer. The specific value of the P may be set based on actual experiences, for example, may be set to 2.

During practical applications, there may be a case that the green light is mistakenly detected as green flash due to failure of the traffic light or low state update frequency. In order to increase the detection accuracy, when the current detection result does not reach the P-th light extinguishment, it is not considered as true green flash; but, only when the current detection result reaches the P-th light extinguishment can it be considered as true green flash.

It is to be further noted that, the drive decision corresponding to the yellow light is the same as the drive decision corresponding to the green flash, and thus, the false detection between the yellow light and the green flash may be neglected.

In one implementation, during practical applications, there is usually a case that the green flash is mistakenly detected as two independent states green light and light extinguishment. In order to increase the detection accuracy, in response to that the target road junction type is a conventional traffic light junction, if two adjacent state detection results are green light and light extinguishment one after another respectively, when the state detection result determined based on a next traffic light image is yellow light, the true results corresponding to the two adjacent state detection results are that the two adjacent state detection results are entirely green flash.

In one implementation, there is usually a case that the yellow flash is always mistakenly detected as yellow light in practical scenarios. In order to solve the technical problem, when it is continuously detected that a time length of the yellow light exceeds a third time window, it is determined that the yellow flash is mistakenly detected as yellow light, and the true result corresponding to the current detection result is yellow flash. The third time window may be set based on actual experiences, for example, may be set to 5 s.

Corresponding to the method embodiments, another embodiment of the present disclosure provides an apparatus for detecting a state of a traffic light. As shown in FIG. 3, the apparatus includes:

an obtaining unit 21, configured to obtain state detection results for the traffic light based on traffic light images;

a first determining unit 22, configured to, according to a plurality of state detection results within a first time window and a traffic light state corresponding to each preset road junction type, determine a target road junction type of a target road junction;

a second determining unit 23, configured to, in response to that a target detection result is present in the state detection results obtained after determining the target road junction type, determine the target detection result as a false detection result, where the target detection result includes a state other than the traffic light state corresponding to the target road junction type.

In one implementation, the apparatus further includes:

an updating unit, configured to, after, according to a plurality of state detection results within the first time window and the traffic light state corresponding to each preset road junction type, determining the target road junction type of the target road junction, in response to that the target road junction type determined according to a plurality of state detection results within a second time window and the traffic light state corresponding to each preset road junction type changes, update the target road junction type.

In one implementation, the first determining unit 22 is configured to, in response to that there are at least two cases with the road junction type of the target road junction determined according to a plurality of state detection results within the first time window, postpone a start time of the first time window until the road junction type determined according to a plurality of state detection results within the postponed first time window and the traffic light state corresponding to each preset road junction type is unique, and determine a last-determined road junction type as the target road junction type.

In one implementation, the apparatus further includes:

a third determining unit, configured to, in response to that the target road junction type is a conventional traffic light junction, when a plurality of consecutive state detection results obtained after the target road junction type is determined all are a first traffic light state and the state detection result determined based on a next traffic light image is a second traffic light state, determine the state detection result determined based the next traffic light image as a false detection result, where the first traffic light state is different from the second traffic light state, and the first traffic light state and the second traffic light state are not adjacent to each other in a traffic light state switching sequence of the conventional traffic light junction.

In one implementation, the apparatus further includes:

a fourth determining unit, configured to, in response to that the target road junction type is a conventional traffic light junction, according to historical detection results and/or a current detection result, determine a true result corresponding to the current detection result, where the historical detection results are state detection results detected within a historical time, and the current detection result is a state detection result currently detected.

In one implementation, the fourth determining unit includes a first determining module or a second determining module;

the first determining module is configured to, by starting from that the historical detection result is yellow light, when the current detection result is red light and a drive decision is a braking-to-stop decision, determine the true result corresponding to the current detection result is red light;

the second determining module is configured to, by starting from the historical detection result is yellow light, in response to that the drive decision is a run-through decision, when a plurality of consecutive state detection results all are that a number of red lights is less than A, or a ratio of red lights in a B number of consecutive state detection results is less than a first preset ratio threshold, determine the true result corresponding to the current detection result is yellow light; when an A number of consecutive state detection results all are red lights, or a ratio of red lights in a B number of consecutive state detection results is greater than or equal to the first preset ratio threshold, determine the true result corresponding to the current detection result is red light, where the A is less than or equal to the B, the A and the B are both positive integers, and the A number of consecutive state detection results and the B number of consecutive state detection results both include the historical detection results and the current detection result.

In one implementation, the fourth determining unit includes:

a third determining module, configured to, in response to that a target vehicle is a leading vehicle, by starting from that the historical detection result is red light, when a plurality of consecutive state detection results all are that a number of green lights is less than C, or a ratio of green lights in a D number of consecutive state detection results is less than a second preset ratio threshold, determine the true result corresponding to the current detection result is red light; when a C number of consecutive state detection results all are green lights, or a ratio of green lights in a D number of consecutive state detection results is greater than or equal to the second preset ratio threshold, determine the true result corresponding to the current detection result is green light, where the C is less than or equal to the D, the C and the D both are positive integers, and the C number of consecutive state detection results and the D number of consecutive state detection results both include the historical detection results and the current detection result.

In one implementation, the apparatus further includes:

a fifth determining unit, configured to, in response to that the target vehicle is in a red light waiting state of leading vehicle, when a speed of the leading vehicle in a target lane changes from 0 to greater than or equal to a preset speed threshold, determine the true result corresponding to the current detection result is green light, where the red light waiting state of leading vehicle includes the speed of the target vehicle as the leading vehicle being 0, the state detection result being red light, and the target vehicle corresponding to the target lane, and the target lane and a lane to which the target vehicle belongs are adjacent lanes having a same travel direction.

In one implementation, the fourth determining unit includes:

a fourth determining module, configured to, by starting from that the historical detection result is green light, when the current detection result does not reach a P-th light extinguishment, determine the true result corresponding to the current detection result is green light; when the current detection result is a P-th light extinguishment, determine the true result corresponding to the current detection result is green flash, wherein the P is a positive integer.

In one implementation, the apparatus further includes:

a sixth determining unit, configured to, in response to that the target road junction type is a conventional traffic light junction, when that two adjacent state detection results are green light and light extinguishment one after another respectively, if the state detection result determined based on a next traffic light image is yellow light, determine the true results corresponding to the two adjacent state detection results are that the two adjacent state detection results are entirely green flash.

In one implementation, the apparatus further includes:

a seventh determining unit, configured to, when it is detected continuously that a time length of yellow light exceeds a third time window, determine that yellow flash is detected falsely as yellow light.

In one implementation, the obtaining unit 21 is configured to, by starting from a preset distance from the target road junction, obtain state detection results for the traffic light based on traffic light images.

In the apparatus for detecting a state of a traffic light in the embodiments of the present disclosure, the target road junction type of the target road junction may be firstly determined according to a plurality of state detection results within the first time window and the traffic light state corresponding to each preset road junction type; after the target road junction type is determined, if there is a target detection result of a state other than the traffic light state corresponding to the target road junction type in the obtained state detection results, the target detection result is determined as a false detection result. Thus, an impossible state detection result of the target road junction can be quickly and accurately recognized, so as to avoid making a wrong drive decision based on the false detection result, thus improving the traffic safety.

Based on the above method embodiments, another embodiment of the present disclosure provides a storage medium, storing executable instructions thereon, where the instructions are executed by a processor to cause the processor to perform the method of any one of the above embodiments.

Based on the above method embodiments, another embodiment of the present disclosure provides an electronic device or computer device, including:

one or more processors;

a storage apparatus, configured to store one or more programs;

where when one or more programs are executed by one or more processors to cause the electronic device or computer device to perform the method of any one of the above embodiments.

Based on the above method embodiments, another embodiment of the present disclosure provides a vehicle, including the apparatus of any one of the above embodiments or the electronic device as described above.

As shown in FIG. 4, the vehicle includes an Electronic Control Unit (ECU) 31, a camera 32, and a TelematicsBox (T-Box) 33. The camera 32 is configured to collect images of a traffic light ahead of the vehicle; the T-Box 33 may serve as a gateway to communicate with a server; the ECU 31 is configured to execute the above method of detecting a state of a traffic light and may also obtain the traffic light images collected by the camera 32, report the traffic light images to the server through the T-Box 33 and receive a false detection result and/or true result determined by the server based on the above method of detecting a state of a traffic light.

The vehicle may further include a Global Positioning System (GPS) positioning device, a Vehicle-to-Everything (V2X) module, and a radar etc. The GPS positioning device is configured to obtain a local geographical position of the vehicle, the V2X module is configured to communicate with other vehicles and roadside devices etc. and the radar is configured to perceive road environment information ahead and/or in other directions.

Corresponding to the method embodiments, the apparatus embodiments have the same technical effects and reference may be made to the method embodiments for specific descriptions. The apparatus embodiments are obtained based on the method embodiments, and reference may be made to the method embodiments for specific descriptions. No redundant descriptions will be made herein. Those skilled in the arts should understand that the accompanying drawings are merely illustrations of one embodiment and the modules or flows in the drawings are not necessarily required for implementing the present disclosure.

Persons of ordinary skills in the arts may understand that the modules in the apparatus of the embodiment may be distributed in the apparatus of the embodiment according to the descriptions of the embodiment and may also be changed accordingly to be located in one or more apparatuses different from the present embodiment. The modules in the above embodiment may be combined into one module or may be split into multiple modules.

Finally, it should be noted that the above embodiments are used only to describe the technical solution of the present disclosure rather than to limit the present disclosure. Although the present disclosure is described in details by referring to the preceding embodiments, persons of ordinary skills in the art should understand that they still can make changes to the technical solution of the preceding embodiments or make equivalent substitution to partial technical features therein, and these changes or substitutions will not cause the essence of the corresponding technical solutions to depart from the spirit and scope of the technical solution of the present disclosure.

What is claimed is:

1. A method of detecting a state of a traffic light, applied to a vehicle, comprising:

obtaining state detection results for the traffic light based on traffic light images collected by a camera on the vehicle;

according to a plurality of state detection results within a first time window and a traffic light state corresponding to each preset road junction type, determining a road junction type of a target road junction;

determining a target detection result as a false detection result when the target detection result comprises a state other than the traffic light state corresponding to the road junction type, wherein the target detection result is a result of the state detection results obtained after determining the road junction type, and is used to indicate a drive decision of the vehicle in a driving process;

wherein the obtaining the state detection results for the traffic light based on the traffic light images collected by the camera on the vehicle comprises:

based on a neural network model, performing state recognition on the traffic light images to obtain the state detection results.

2. The method of claim 1, wherein after according to a plurality of state detection results within the first time window and the traffic light state corresponding to each preset road junction type, determining the road junction type of the target road junction, the method further comprises:

when the road junction type determined according to a plurality of state detection results within a second time window and the traffic light state corresponding to each preset road junction type changes, updating the road junction type.

3. The method of claim 1, wherein, according to a plurality of state detection results within the first time window and the traffic light state corresponding to each preset road junction type, determining the road junction type of the target road junction comprises:

when there are at least two cases with the road junction type of the target road junction determined according to a plurality of state detection results within the first time window, postponing a start time of the first time window until the road junction type determined according to a plurality of state detection results within the postponed first time window and the traffic light state corresponding to each preset road junction type is unique, and determining a last-determined road junction type as the road junction type.

4. The method of claim 1, wherein when the road junction type is a conventional traffic light road junction, a traffic light state of which comprises red light, yellow light, green light and green flash, the method further comprises:

when a plurality of consecutive state detection results obtained after the road junction type is determined all are a first traffic light state and the state detection result determined based on a next traffic light image is a second traffic light state, determining the state detection result determined based the next traffic light image as a false detection result, wherein the first traffic light state is different from the second traffic light state, and the first traffic light state and the second traffic light state are not adjacent to each other in a traffic light state switching sequence of the conventional traffic light road junction.

5. The method of claim 1, wherein when the road junction type is a conventional traffic light road junction, a traffic light state of which comprises red light, yellow light, green light and green flash, the method further comprises:

according to historical detection results or a current detection result, determining a true result corresponding to the current detection result, wherein the historical detection results are state detection results detected within a historical time, and the current detection result is a state detection result currently detected.

6. The method of claim 5, wherein according to the historical detection results or the current detection result, determining the true result corresponding to the current detection result comprises:

by starting from that the historical detection result is yellow light, when the current detection result is red light and a drive decision is a braking-to-stop decision, determining the true result corresponding to the current detection result is red light; or, by starting from the historical detection result is yellow light, when the drive decision is a run-through decision, when a plurality of consecutive state detection results all are that a number of red lights is less than A, or a ratio of red lights in a B number of consecutive state detection results is less than a first preset ratio threshold, determining the true result corresponding to the current detection result is yellow light; when an A number of consecutive state detection results all are red lights, or a ratio of red lights in a B number of consecutive state detection results is greater than or equal to the first preset ratio threshold, determining the true result corresponding to the current detection result is red light, wherein the A is less than or equal to the B, the A and the B are both positive integers, and the A number of consecutive state detection results and the B number of consecutive state detection results both comprise the historical detection results and the current detection result.

7. The method of claim 5, wherein when a target vehicle is a leading vehicle, according to the historical detection results or the current detection result, determining the true result corresponding to the current detection result comprises:

by starting from that the historical detection result is red light, when a plurality of consecutive state detection results all are that a number of green lights is less than C, or a ratio of green lights in a D number of consecutive state detection results is less than a second preset ratio threshold, determining the true result corresponding to the current detection result is red light; when a C number of consecutive state detection results all are green lights, or a ratio of green lights in a D number of consecutive state detection results is greater than or equal to the second preset ratio threshold, determining the true result corresponding to the current detection result is green light, wherein the C is less than or equal to the D, the C and the D both are positive integers, and the C number of consecutive state detection results and the D number of consecutive state detection results both comprise the historical detection results and the current detection result.

8. The method of claim 5, wherein when the target vehicle is in a red light waiting state of leading vehicle, the method further comprises:

when a speed of the leading vehicle in a target lane changes from 0 to greater than or equal to a preset speed threshold, determining the true result corresponding to the current detection result is green light, wherein the red light waiting state of leading vehicle comprises the speed of the target vehicle as the leading vehicle being 0, the state detection result being red light, and the target vehicle corresponding to the target lane, and the target lane and a lane to which the target vehicle belongs are adjacent lanes having a same travel direction.

9. The method of claim 5, wherein, according to the historical detection results or the current detection result, determining the true result corresponding to the current detection result comprises:

by starting from that the historical detection result is green light, when the current detection result does not reach a P-th light extinguishment, determining the true result corresponding to the current detection result is green light; when the current detection result is a P-th light extinguishment, determining the true result corresponding to the current detection result is green flash, wherein the P is a positive integer.

10. The method of claim 1, wherein when the road junction type is a conventional traffic light road junction, a traffic light state of which includes red light, yellow light, green light and green flash, the method further comprises:

when two adjacent state detection results are green light and light extinguishment one after another respectively, when the state detection result determined based on a next traffic light image is yellow light, determining the true results corresponding to the two adjacent state detection results are that the two adjacent state detection results are entirely green flash.

11. The method of claim 1, further comprising:

when it is detected continuously that a time length of yellow light exceeds a third time window, determining yellow flash is detected falsely as yellow light.

12. The method of claim 1, wherein the obtaining the state detection results for the traffic light based on the traffic light images collected by the camera on the vehicle further comprises:

by starting from a preset distance from the target road junction, obtaining the state detection results for the traffic light based on the traffic light images.

13. An apparatus for detecting a state of a traffic light, applied to a vehicle, comprising:

one or more processors, and a non-transitory storage medium in communication with the one or more processors, the non-transitory storage medium configured to store program instructions, wherein, when executed by the one or more processors, the instructions cause the apparatus to perform:

obtaining state detection results for the traffic light based on traffic light images collected by a camera on the vehicle;

according to a plurality of state detection results within a first time window and a traffic light state corresponding to each preset road junction type, determining a road junction type of a target road junction;

determining a target detection result as a false detection result when the target detection result comprises a state other than the traffic light state corresponding to the road junction type, wherein the target detection result is a result of the state detection results obtained after determining the road junction type, and is used to indicate a drive decision of the vehicle in a driving process;

wherein the apparatus is further caused to perform:

based on a neural network model, performing state recognition on the traffic light images to obtain the state detection results.

14. The apparatus of claim 13, further comprising:

after, according to a plurality of state detection results within the first time window and the traffic light state corresponding to each preset road junction type, determining the road junction type of the target road junction, and when the road junction type determined according to a plurality of state detection results within a second time window and the traffic light state corresponding to each preset road junction type changes, updating the road junction type.

15. The apparatus of claim 13, further comprising: when there are at least two cases with the road junction type of the target road junction determined according to a plurality of state detection results within the first time window, postponing a start time of the first time window until the road junction type determined according to a plurality of state detection results within the postponed first time window and the traffic light state corresponding to each preset road junction type is unique, and determining a last-determined road junction type as the target road junction type.

16. The apparatus of claim 13, further comprising:

when the road junction type is a conventional traffic light road junction, a traffic light state of which includes red light, yellow light, green light and green flash, when a plurality of consecutive state detection results obtained after the road junction type is determined all are a first traffic light state and the state detection result determined based on a next traffic light image is a second traffic light state, determining the state detection result determined based the next traffic light image as a false detection result, wherein the first traffic light state is different from the second traffic light state, and the first traffic light state and the second traffic light state are not adjacent to each other in a traffic light state switching sequence of the conventional traffic light junction.

17. The apparatus of claim 13, further comprising:

when the road junction type is a conventional traffic light road junction, a traffic light state of which includes red light, yellow light, green light and green flash, according to historical detection results or a current detection result, determining a true result corresponding to the current detection result, wherein the historical detection results are state detection results detected within a historical time, and the current detection result is a state detection result currently detected.

18. A non-transitory storage medium, storing computer programs, wherein the programs are executed by a processor to perform the method of claim 1.

\* \* \* \* \*